United States Patent
Son (10) Patent No.: US 11,118,623 B2
(45) Date of Patent: Sep. 14, 2021

(54) RACK BUSH FOR VEHICLE STEERING APPARATUS

(71) Applicant: HYUNDAI MOBIS CO., LTD., Seoul (KR)

(72) Inventor: Chang Wook Son, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/817,411

(22) Filed: Mar. 12, 2020

(65) Prior Publication Data

US 2021/0140471 A1    May 13, 2021

(30) Foreign Application Priority Data

Nov. 7, 2019  (KR) ........................ 10-2019-0141556

(51) Int. Cl.
| | |
|---|---|
| *F16C 27/02* | (2006.01) |
| *B62D 3/12* | (2006.01) |
| *F16C 17/12* | (2006.01) |
| *F16C 17/10* | (2006.01) |
| *F16C 25/02* | (2006.01) |

(52) U.S. Cl.
CPC ............. *F16C 17/12* (2013.01); *F16C 17/10* (2013.01); *F16C 25/02* (2013.01); *F16C 27/02* (2013.01); *B62D 3/12* (2013.01); *F16C 2326/24* (2013.01)

(58) Field of Classification Search
CPC .. B62D 3/12; B62D 3/126; B62D 5/22; F16C 17/02; F16C 25/02; F16C 27/02; F16C 27/063; F16C 2326/24
See application file for complete search history.

(56) References Cited

U.S. PATENT DOCUMENTS

| | | | | |
|---|---|---|---|---|
| 4,101,227 A | * | 7/1978 | Herbenar ................. | B62D 7/16 403/27 |
| 2010/0251839 A1 | * | 10/2010 | Kim ...................... | F16C 27/063 74/29 |
| 2010/0278467 A1 | * | 11/2010 | Hirose .................. | F16C 29/002 384/283 |
| 2015/0204381 A1 | * | 7/2015 | Zaike ..................... | F16C 29/02 384/202 |

(Continued)

FOREIGN PATENT DOCUMENTS

| | | | | | |
|---|---|---|---|---|---|
| JP | 2010175008 A | * | 8/2010 | ............. | F16C 27/02 |
| JP | 2017067220 A | * | 4/2017 | ............ | F16C 29/002 |

(Continued)

OTHER PUBLICATIONS

Office Action of Korean Patent Application No. 10-2019-0141556—6 pages (dated Oct. 13, 2020).

*Primary Examiner* — Phillip A Johnson
(74) *Attorney, Agent, or Firm* — DLA Piper LLP (US)

(57) ABSTRACT

Disclosed herein is a rack bush for vehicle steering apparatus, which includes a bush body having an outer peripheral surface that is in contact with an inner surface of a rack housing and an inner peripheral surface that is in contact with a rack bar, the bush body being configured to guide longitudinal movement of the rack bar, the bush body including a large diameter portion and a small diameter portion, a plurality of slits arranged on the bush body in a circumferential direction thereof, and a damper mounted to the bush body and configured to absorb an impact occurring between the rack bar and the bush body.

8 Claims, 5 Drawing Sheets

(56) References Cited

U.S. PATENT DOCUMENTS

2017/0130769 A1* 5/2017 Ikeda ........................ B62D 3/12

FOREIGN PATENT DOCUMENTS

| KR | 10-0452299 B1 | 10/2004 |
| KR | 10-2010-0110441 A | 10/2010 |
| KR | 10-2011-0096807 A | 8/2011 |
| KR | 10-1611570 B1 | 4/2016 |

* cited by examiner

RACK BUSH FOR VEHICLE STEERING APPARATUS

CROSS-REFERENCE TO RELATED APPLICATION

The present application claims priority under 35 U.S.C. § 119(a) to Korean Patent Application No. 10-2019-0141556, filed on Nov. 7, 2019 in the Korean Intellectual Property Office, which is incorporated herein by reference in its entirety.

BACKGROUND

1. Technical Field

Embodiments of the present disclosure relate to a rack bush for vehicle steering apparatus, and more particularly, to a rack bush for vehicle steering apparatus, which is capable of reducing an occurrence of a clearance while enhancing durability.

2. Related Art

In general, a steering system is a system for allowing a driver to change the direction of progress of a vehicle as intended and for assisting the driver in propelling the vehicle in a desired direction by arbitrarily changing the center of rotation of the front wheel of the vehicle.

A gear box includes a rack housing provided on the lower end thereof and a valve housing provided on the upper end thereof to be coupled to the rack housing, wherein the rack housing and the valve housing define the external appearance of the gear box. The valve housing is provided therein with an input shaft, which is rotated by receiving a rotational force generated through a steering wheel by a driver, and with a pinion shaft which is operatively connected to the lower end of the input shaft to extend into the rack housing, the pinion shaft having a pinion gear formed on the outer peripheral surface thereof.

The rack housing is provided therein with a rack bar, which is an axially elongated circular rod and has a rack gear engaged, at one side of the middle thereof, to the pinion gear to convert rotational motion into rectilinear motion, and with a rack bar supporter installed opposite to the rack gear to elastically support the rack bar toward the pinion gear.

In the gear box, a rack bush for supporting the rack bar is an important component that affects gear friction force, joint performance, etc., and requires support rigidity, damping performance, and the like.

A conventional rack bar is supported by a rack bush and a support yoke. The support yoke serves to slide the rack bar with low friction force while supporting the rack bar. The support yoke is conventionally composed of a combination of many single parts, which causes an increase in assembly time and a decrease in productivity. Therefore, it is necessary to improve this issue.

The related art of the present disclosure is disclosed in Korean Patent No. 10-452299 (registered on Oct. 1, 2004, entitled "Rack Bush and Rack Stopper of Steering Device").

SUMMARY

Various embodiments are directed to a rack bush for vehicle steering apparatus, which is capable of reducing an occurrence of a clearance while enhancing durability.

In an embodiment, there is provided a rack bush for vehicle steering apparatus, which includes a bush body having an outer peripheral surface that is in contact with an inner surface of a rack housing and an inner peripheral surface that is in contact with a rack bar, the bush body being configured to guide longitudinal movement of the rack bar, the bush body including a large diameter portion and a small diameter portion, a plurality of slits arranged on the bush body in a circumferential direction thereof, and a damper mounted to the bush body and configured to absorb an impact occurring between the rack bar and the bush body.

The large diameter portion may be provided on one end of the bush body and the small diameter portion may be provided on the other end of the bush body. The slits may include at least one first slit cut toward the small diameter portion from an end of the large diameter portion, and at least one second slit cut toward the large diameter portion from an end of the small diameter portion.

The first and second slits may be alternately formed in the circumferential direction of the bush body.

Each of the slits may further include a through-hole formed at an inner end of each of the first and second slits, the through-hole having an inner diameter larger than the widths of the first and second slits.

The bush body may further include an annular groove formed in the end of the small diameter portion.

The damper may be an O-ring mounted in a receiving groove recessed toward the rack bar on the groove.

The damper may consist of a plurality of dampers mounted in a longitudinal direction of the bush body.

The rack housing may include a stopper formed on the inner surface thereof to face the large diameter portion.

The rack bush may further include a spring installed between the stopper and the large diameter portion, the spring being configured to provide an elastic force to the bush body to allow the bush body to come into contact with the inner surface of the rack housing.

The bush body may have a tapered shape in which its outer diameter decreases toward the small diameter portion from the large diameter portion.

As apparent from the above description, the rack bush for vehicle steering apparatus according to the present disclosure can stably support the sliding of the rack bar while enhancing durability and reducing the occurrence of the clearance.

In addition, since the number of parts is reduced in the present disclosure, compared to the related art, the weight of the product can be reduced, thereby improving the fuel efficiency of the vehicle.

Furthermore, since the number of parts is reduced in the present disclosure, compared to the related art, the assembly time can be reduced, thereby improving productivity.

DETAILED DESCRIPTION

Hereinafter, a rack bush for vehicle steering apparatus will be described with reference to the accompanying drawings through various examples of embodiments. It should be noted that the drawings are not necessarily to scale and may be exaggerated in thickness of lines or sizes of components for clarity and convenience of description.

Furthermore, the terms as used herein are terms defined in consideration of functions of the disclosure and may change depending on the intention or practice of a user or an operator. Therefore, these terms should be defined based on the overall disclosures set forth herein.

Figure 1:
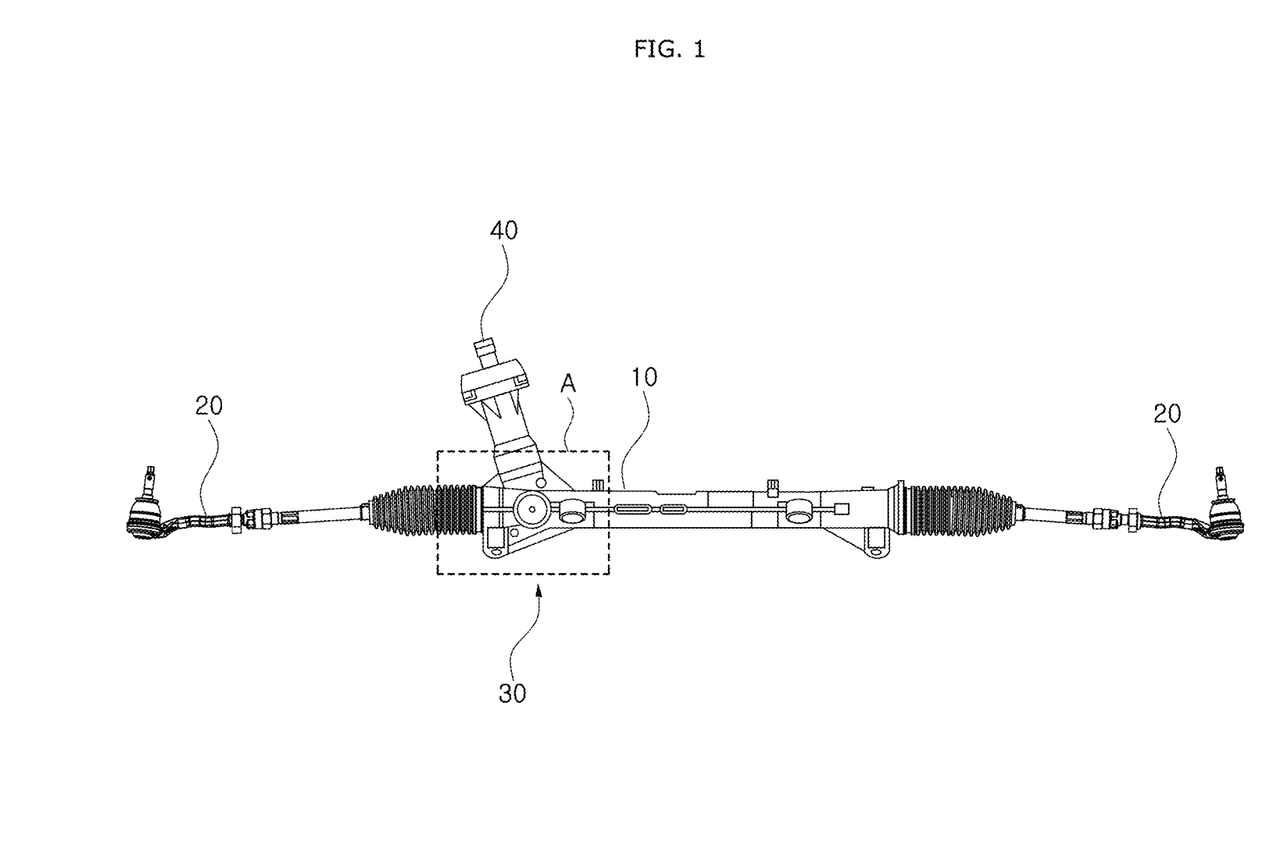
FIG. 1 is a perspective view illustrating a vehicle steering system equipped with a rack bush for vehicle steering apparatus according to an embodiment of the present disclosure.
Figure 2:
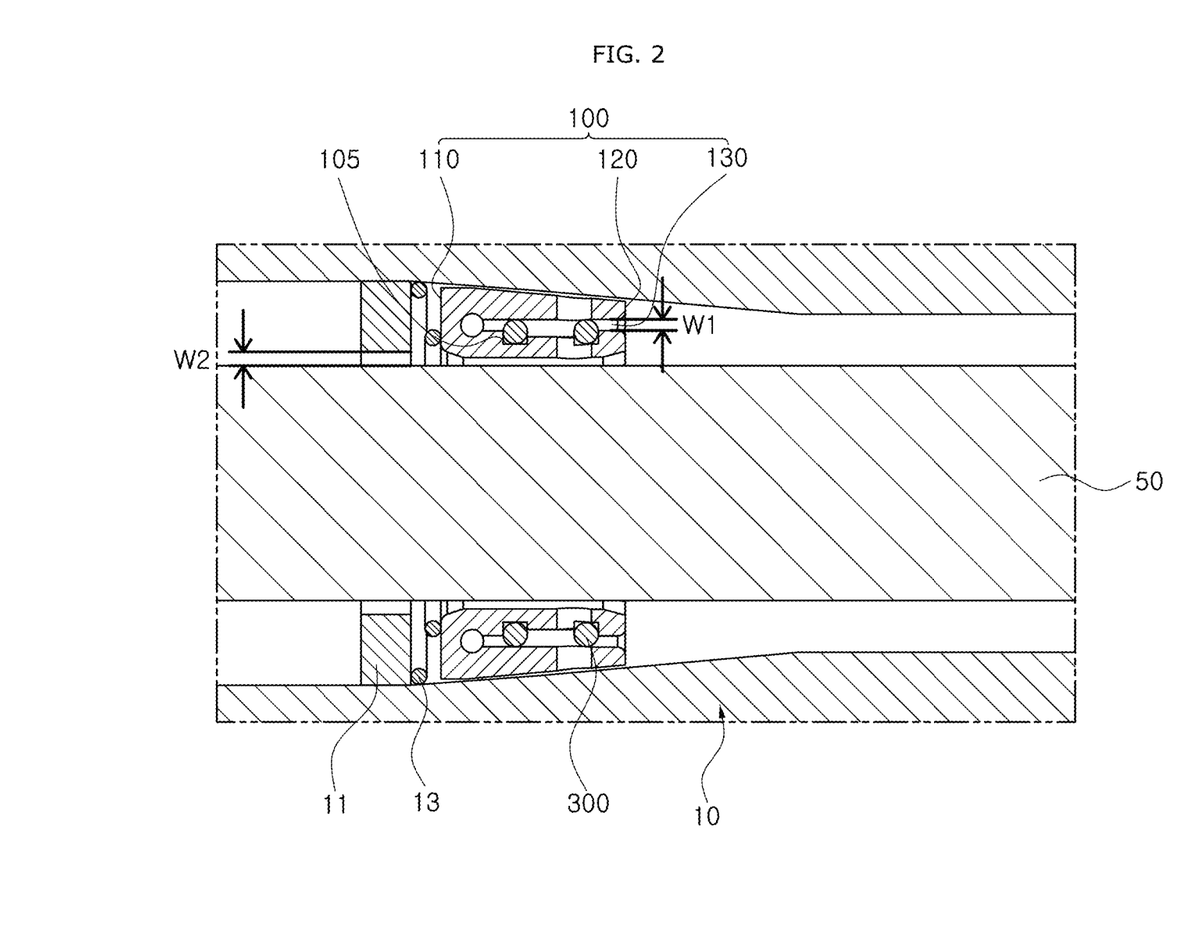
FIG. 2 is a cross-sectional view illustrating portion A of FIG. 1 and illustrates main parts of the vehicle steering system.
Figure 3:
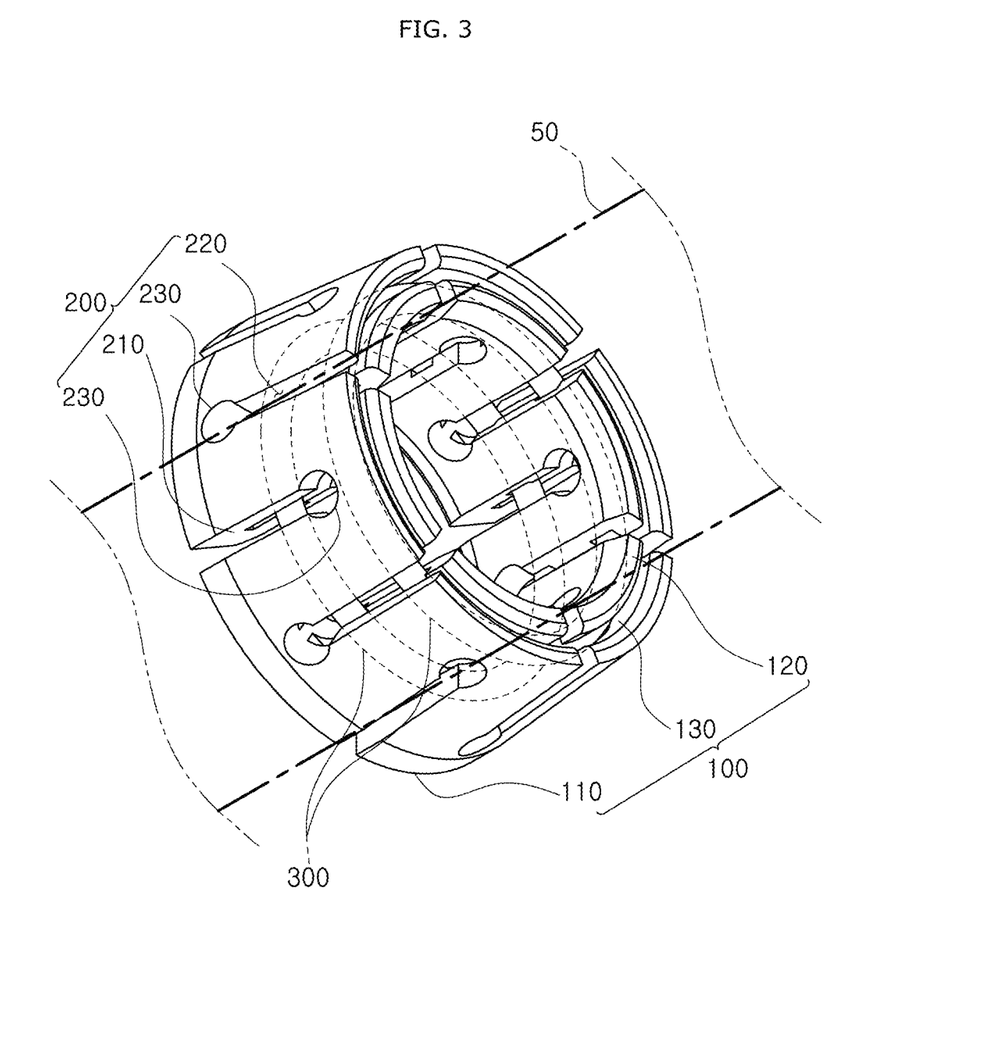
FIG. 3 is a perspective view illustrating the rack bush for vehicle steering apparatus according to the embodiment of the present disclosure.
Figure 4:
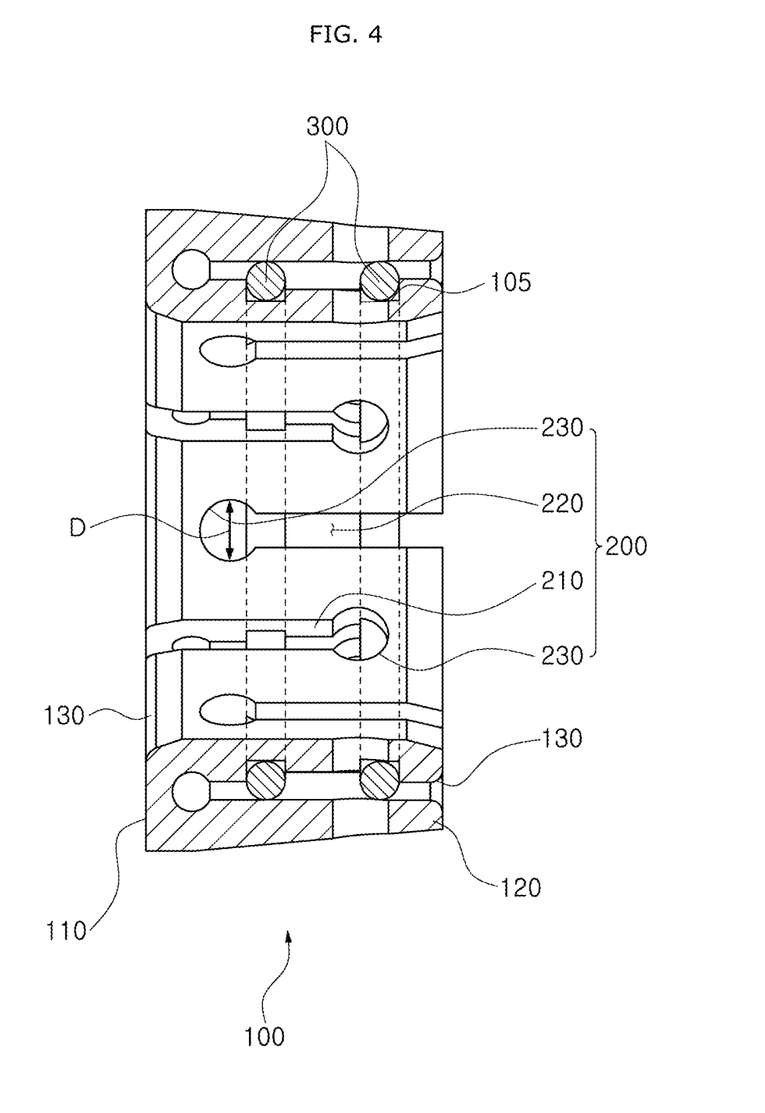
FIG. 4 is a cross-sectional view illustrating the rack bush for vehicle steering apparatus according to the embodiment of the present disclosure.
Figure 5:
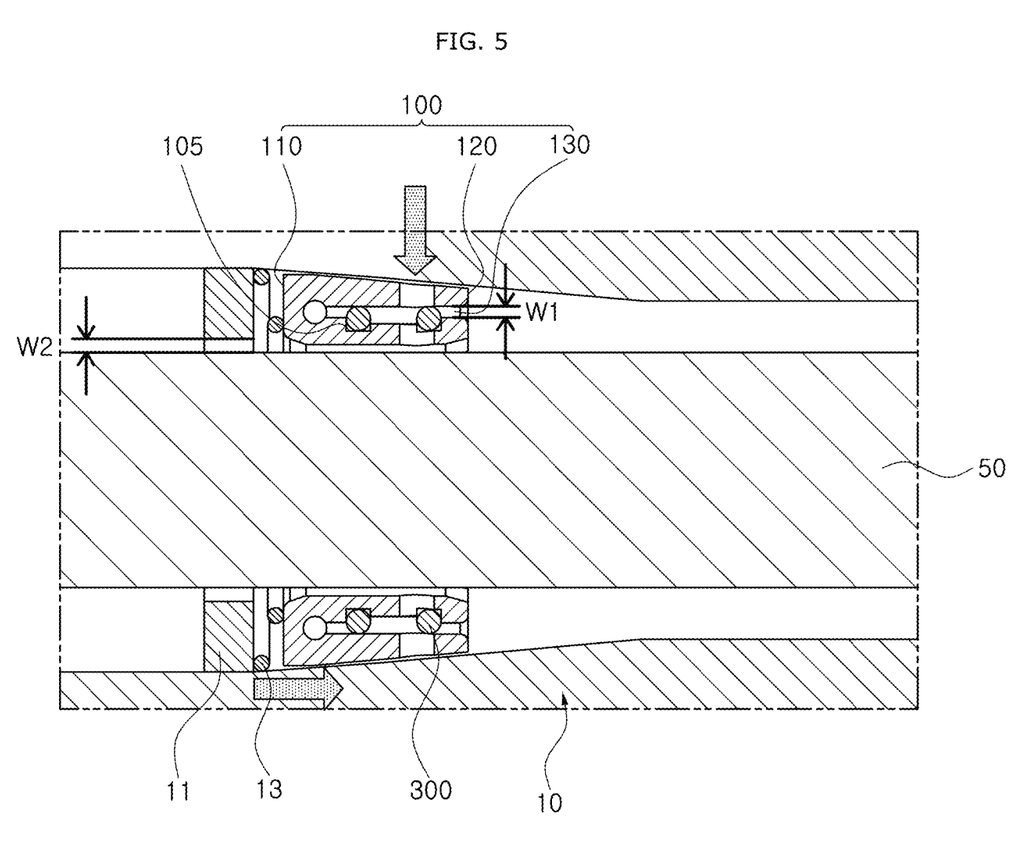
FIG. 5 is a view illustrating an operation of the rack bush for vehicle steering apparatus according to the embodiment of the present disclosure.

FIG. 1 is a perspective view illustrating a vehicle steering system equipped with a rack bush for vehicle steering apparatus according to an embodiment of the present disclosure. FIG. 2 is a cross-sectional view illustrating portion A of FIG. 1 and illustrates main parts of the vehicle steering system. FIG. 3 is a perspective view illustrating the rack bush for vehicle steering apparatus according to the embodiment of the present disclosure. FIG. 4 is a cross-sectional view illustrating the rack bush for vehicle steering apparatus according to the embodiment of the present disclosure. FIG. 5 is a view illustrating an operation of the rack bush for vehicle steering apparatus according to the embodiment of the present disclosure.

FIG. 1 illustrates the vehicle steering system equipped with the rack bush for vehicle steering apparatus according to the embodiment of the present disclosure. The vehicle steering system includes a pinion gear 40, a rack housing 10, and a steering gear box 30 installed in the rack housing 10 to convert a rotational force, generated by the operation of a steering wheel (not illustrated), into rectilinear movement of a rack bar 50. The pinion gear 40 is rotated along with the steering wheel to move the rack bar 50, accommodated in the rack housing 10, in left and right directions. Tie rod ends 20 are provided at both ends of the rack bar 50. The tie rod ends 20 connect the rack bar 50 to wheels (not illustrated), thereby enabling a vehicle to be steered by rotating the wheels along with the movement of the rack bar 50.

The rack bush for vehicle steering apparatus according to the embodiment of the present disclosure is installed to surround the rack bar 50 inside each end of the rack housing 10 to guide the axial movement of the rack bar 50.

Referring to FIGS. 2 to 5, the rack bush for vehicle steering apparatus according to the embodiment of the present disclosure includes a bush body 100, a slit 200, and a damper 300. The bush body 100 has an outer peripheral surface that is in contact with the inner surface of the rack housing 10 and an inner peripheral surface that is in contact with the rack bar 50. The bush body 100 has a hollow shape to guide the longitudinal movement of the rack bar 50, and includes a large diameter portion 110 and a small diameter portion 120.

The large diameter portion 110 is formed on one side (the left of FIG. 2) of the bush body 100, and the small diameter portion 120 is formed on the other side (the right of FIG. 2) of the bush body 100. The large diameter portion 110 has a larger outer diameter than the small diameter portion 120. Thus, the bush body 100 has a tapered shape in which the outer diameter thereof decreases toward the small diameter portion 120 from the large diameter portion 110. The inner portion of the rack housing 10 to which the bush body 100 is mounted corresponds to the shape of the bush body 100. Since the bush body 100 is tapered, the bush body 100 may compensate for an occurrence of a clearance while moving into the rack housing 10 (from left to right in FIG. 2) even though the clearance occurs.

The bush body 100 further includes a groove 130. The groove 130 is an annular groove recessed toward the large diameter portion 110 from the end of the small diameter portion 120. The groove 130 is annularly formed in the small diameter portion 120 of the bush body 100, thereby providing an elastic restoring force to the bush body 100 which is pressed in a vertical direction in FIG. 2.

The groove 130 is formed with a receiving groove 105. The damper 30 is mounted in the receiving groove 105, and the receiving groove 105 is recessed toward the rack bar 50 on the groove 130 to provide a space for mounting the damper 300. The receiving groove 105 consists of a plurality of receiving grooves arranged in the longitudinal direction of the bush body 100 so as to correspond to the number of dampers. The damper 300 is mounted in the bush body 100 through the groove 130. The width of the groove 130 is indicated as W1 in FIGS. 2 and 5 of the present disclosure.

The slit 200 consists of a plurality of slits arranged in the circumferential direction of the bush body 100 on the outer surface thereof. The slits 200 allow the bush body 100 to have an elastic force for autonomous contraction and relaxation when the rack bar 50 is coupled to the rack housing 10.

The slits 200 include first slits 210 and second slits 220. The first slits 210 each are cut from the large diameter portion 110 toward the small diameter portion 120 (from left to right in FIG. 3). The second slits 220 each are cut from the small diameter portion 120 toward the large diameter portion 110 (from right to left in FIG. 3).

The first and second slits 210 and 220 are alternately formed in the circumferential direction of the bush body 100. Since the first and second slits 210 and 220 are alternately formed in the circumferential direction of the bush body 100, the bush body 100 may have a uniform elastic force at both sides thereof. Thus, the durability of the bush body 100 can be enhanced.

In the present disclosure, each of the slits 200 further includes a through-hole 230. The through-hole 230 is formed at the inner end of each of the first and second slits 210 and 220, and has an inner diameter D larger than the widths of the first and second slits 210 and 220. Since the through-hole 230 is formed at the inner end of each of the first and second slits 210 and 220, the first and second slits 210 and 220 may each have an elastic force. The through-hole 230 is formed through the bush body 100. Although the through-hole 230 is illustrated as being circular in the drawings, the present disclosure is not limited thereto. For example, the through-hole 230 may have various shapes such as an ellipse.

The damper 300 is mounted to the bush body 100 and absorbs the impact occurring between the bush body 100 and the rack bar 50. That is, the damper 300 serves to absorb the impact occurring between the rack bar 50 and the bush body 100 due to the movement or rotation of the rack bar 50 or external factors. For example, an impact may occur between the rack bar 50 and the bush body 100 according to the relative movement between the rack bar 50 and the bush body 100.

The damper 300 is made of an elastically deformable material. In the present disclosure, the elastically deformable material of the damper 300 includes rubber, silicon, or the like.

The damper 300 is mounted in the associated receiving groove 105 formed on the groove 130 of the bush body 100. The receiving groove 105 is recessed toward the rack bar 50 on the groove 130. The damper 300 has an O-ring shape, and consists of a plurality of dampers arranged in the longitudinal direction of the bush body 100. The dampers 300 may be mounted in the respective receiving grooves 105 of the bush body 100 to sufficiently and uniformly absorb impacts between the bush body 100 and the rack bar 50.

The rack housing 10 includes a stopper 11 formed on the inner surface thereof to face the large diameter portion 110 of the bush body 100. The stopper 11 is disposed on the large diameter portion 110 of the bush body 100 to restrict the movement of the bush body 100 to the left (in FIG. 2) where the stopper 11 is disposed. The inner diameter of the rack housing 10 is narrowed to the right (in FIG. 2), so that the movement of the bush body 100 to the right is restricted.

A spring 13 is installed between the stopper 11 and the large diameter portion 110 of the bush body 100. The spring 13 provides an elastic force to the bush body 100 to allow the bush body 100 to come into contact with the inner surface of the rack housing 10.

The bush body 100 compresses the spring 13 when moving to the left, and the bush body 100 is moved to the right by the elastic force of the spring 13 to be pressed against the rack housing 10.

The operation of the rack bush for vehicle steering apparatus according to the embodiment of the present disclosure will be described with reference to FIG. 5.

The rack bar 50 is slidably mounted to the bush body 100. When the bush body 100 is moved to the left in FIG. 5 by the operation of the rack bar 50, the movement of the bush body 100 to the left is restricted by the spring 13 and the stopper 11. In addition, the bush body 100 is moved to the right by the elastic force of the spring 13.

In this case, when the bush body 100 is pressed by the contact with the inner surface of the rack housing 10, the bush body 100 is elastically restored by the first and second slits 210 and 220 and the through-holes 230. In addition, the vertical direction of the bush body 100 is elastically restored by the groove 130.

As the bush body 100 is moved to the right by the spring 13 and the stopper 11, a clearance W2 between the stopper 11 and the rack bar 50 may be compensated for. Meanwhile, the dampers 300 mounted in the receiving grooves 105 of the bush body 100 absorb the impacts occurring between the rack bar 50 and the bush body 100.

In the present disclosure, W1 refers to the maximum width of the groove 130, namely, the width of the groove 130 before the bush body 100 is compressed. The bush body 100 is compressed in the process in which it is mounted in the rack housing 10, in which case the width of the groove 130 is smaller than its maximum width W1. The groove 130 serves to compensate for the clearance between the bush body 100 and the rack bar 50 due to the wear and tear of the bush body 100. Accordingly, the groove 130 may be referred to as a clearance compensation zone.

The bush body 100 is installed inside the rack housing 10 in a compressed state. Thus, the bush body 100 may be disposed in the rack housing 10 in the state in which the width of the groove 130 is smaller than its maximum width W1, namely, in the compressed state.

Wear occurs as the bush body 100 comes into contact with the rack bar 50. When the inner peripheral surface of the bush body 100 is worn, the width of the groove 130 becomes larger by the amount that the bush body 100 is worn.

That is, a clearance occurs between the inner peripheral surface of the bush body 100 and the rack bar 50 as the inner peripheral surface of the bush body 100 is worn, and in order to compensate for the clearance, the width of the groove 130 is enlarged.

Since the width of the groove 130 is smaller than its original width W1 while the bush body 100 is mounted in the rack housing 10, the width of the groove 130 is gradually enlarged in proportion to the amount that the inner peripheral surface of the bush body 100 is worn.

However, since the groove 130 has the maximum width W1 before the bush body 100 is compressed, the groove 130 may not have a width larger than its maximum width W1.

Meanwhile, when the clearance between the bush body 100 and the rack bar 50 exceeds the maximum width W1 of the groove 130 as the bush body 100 continues to be worn, the clearance may not be compensated for even though the width of the groove 130 is returned to its original state. Hence, the coupling between the inner peripheral surface of the bush body 100 and the rack bar 50 becomes loose.

In this case, the bush body 100 is moved to the right (in FIG. 5) by the load of the spring 13 acting in the axial direction (the left and right directions in FIG. 5). Since the gap between the rack housing 10 and the rack bar 50 becomes smaller as the bush body 100 moves to the right, the bush body 100 moved to the right by the spring 13 may be kept again in contact with the outer surface of the rack bar 50.

The rack bush for vehicle steering apparatus according to the present disclosure can stably support the sliding of the rack bar while enhancing durability and reducing the occurrence of the clearance.

In addition, since the number of parts is reduced in the present disclosure, compared to the related art, the weight of the product can be reduced, thereby improving the fuel efficiency of the vehicle.

Furthermore, since the number of parts is reduced in the present disclosure, compared to the related art, the assembly time can be reduced, thereby improving productivity.

While various embodiments have been described above, it will be understood by those skilled in the art that the embodiments described are by way of example only. It will be apparent to those skilled in the art that various modifications and other equivalent embodiments may be made without departing from the spirit and scope of the disclosure. Accordingly, the true technical protection scope of the disclosure should be defined by the appended claims.

What is claimed is:

1. A rack bush for vehicle steering apparatus, comprising:
   a bush body having an outer peripheral surface that is in contact with an inner surface of a rack housing and an inner peripheral surface that is in contact with a rack bar, the bush body being configured to guide longitudinal movement of the rack bar, the bush body comprising a large diameter portion and a small diameter portion;
   a plurality of slits arranged on the bush body in a circumferential direction thereof; and
   a damper mounted to the bush body and configured to absorb an impact occurring between the rack bar and the bush body,
   wherein the bush body further comprises an annular groove formed in the end of the small diameter portion, wherein the damper is an O-ring mounted in a receiving groove recessed toward the rack bar on the groove.

2. The rack bush according to claim 1, wherein:
the large diameter portion is provided on one end of the bush body and the small diameter portion is provided on the other end of the bush body; and
the slits comprise at least one first slit cut toward the small diameter portion from an end of the large diameter portion, and at least one second slit cut toward the large diameter portion from an end of the small diameter portion.

3. The rack bush according to claim 2, wherein the first and second slits are alternately formed in the circumferential direction of the bush body.

4. The rack bush according to claim 3, wherein each of the slits further comprises a through-hole formed at an inner end of each of the first and second slits, the through-hole having an inner diameter larger than the widths of the first and second slits.

5. The rack bush according to claim 1, wherein the damper consists of a plurality of dampers mounted in a longitudinal direction of the bush body.

6. The rack bush according to claim 1, wherein the rack housing comprises a stopper formed on the inner surface thereof to face the large diameter portion.

7. A rack bush for a vehicle steering apparatus comprising:
a bush body having an outer peripheral surface that is in contact with an inner surface of a rack housing and an inner peripheral surface that is in contact with a rack bar, the bush body being configured to guide longitudinal movement of the rack bar, the bush body comprising a large diameter portion and a small diameter portion;
a plurality of slits arranged on the bush body in a circumferential direction thereof; and
a damper mounted to the bush body and configured to absorb an impact occurring between the rack bar and the bush body,
wherein the rack housing comprises a stopper formed on the inner surface thereof to face the large diameter portion,
further comprising a spring installed between the stopper and the large diameter portion, the spring being configured to provide an elastic force to the bush body to allow the bush body to come into contact with the inner surface of the rack housing.

8. A rack bush for a vehicle steering apparatus, comprising:
a bush body having an outer peripheral surface that is in contact with an inner surface of a rack housing and an inner peripheral surface that is in contact with a rack bar, the bush body being configured to guide longitudinal movement of the rack bar, the bush body comprising a large diameter portion and a small diameter portion;
a plurality of slits arranged on the bush body in a circumferential direction thereof; and
a damper mounted to the bush body and configured to absorb an impact occurring between the rack bar and the bush body,
wherein the bush body has a tapered shape in which its outer diameter decreases toward the small diameter portion from the large diameter portion.

* * * * *